(12) United States Patent
Wilcox et al.

(10) Patent No.: US 8,270,844 B2
(45) Date of Patent: Sep. 18, 2012

(54) LOW JITTER RF DISTRIBUTION SYSTEM

(75) Inventors: Russell Wilcox, El Cerrito, CA (US);
Lawrence Doolittle, Walnut Creek, CA (US); Gang Huang, Albany, CA (US)

(73) Assignee: The Regents of the University of California, Oakland, CA (US)

( * ) Notice: Subject to any disclaimer, the term of this patent is extended or adjusted under 35 U.S.C. 154(b) by 443 days.

(21) Appl. No.: 12/625,135

(22) Filed: Nov. 24, 2009

(65) Prior Publication Data

US 2011/0123200 A1    May 26, 2011

(51) Int. Cl.
*H04B 10/00* (2006.01)
(52) U.S. Cl. .......... 398/161; 398/158; 398/209; 398/195
(58) Field of Classification Search .......... 398/158–161, 398/182–201, 208–210; 372/30
See application file for complete search history.

(56) References Cited

U.S. PATENT DOCUMENTS

| | | | | |
|---|---|---|---|---|
| 5,031,234 A * | 7/1991 | Primas et al. | ................. | 398/154 |
| 5,467,942 A * | 11/1995 | Abbas et al. | ................. | 244/1 R |
| 5,673,133 A * | 9/1997 | Imaoka et al. | ................. | 398/202 |
| 5,778,016 A * | 7/1998 | Sucha et al. | ................. | 372/38.1 |
| 5,917,633 A * | 6/1999 | Gambini et al. | ................. | 398/32 |
| 6,687,270 B1 * | 2/2004 | Robertson, III | ................. | 372/30 |
| 6,831,935 B2 * | 12/2004 | Ye et al. | ................. | 372/18 |
| 7,181,146 B1 * | 2/2007 | Yorks | ................. | 398/195 |
| 7,397,567 B2 * | 7/2008 | Kaertner et al. | ................. | 356/483 |
| 7,593,644 B2 * | 9/2009 | Kaertner et al. | ................. | 398/154 |
| 7,602,825 B1 * | 10/2009 | Lin et al. | ................. | 372/30 |
| 8,078,060 B2 * | 12/2011 | Wilcox et al. | ................. | 398/154 |
| 2005/0265406 A1 * | 12/2005 | Kaertner et al. | ................. | 372/30 |

OTHER PUBLICATIONS

Russell Wilcox, et al., "Stable transmission of radio frequency signals on fiber links using interferometric delay sensing," Optics Letters / vol. 34, No. 20 / Oct. 15, 2009.
Staples, J.W., A Femtosecond-Level Fiber-Optics Timing Distribution System Using Frequency-Offset Interferometry . Lawrence Berkeley National Laboratory: LBNL-775E, Nov. 26, 2008.

* cited by examiner

*Primary Examiner* — Agustin Bello
(74) *Attorney, Agent, or Firm* — Arent Fox LLP

(57) ABSTRACT

A timing signal distribution system includes an optical frequency stabilized laser signal amplitude modulated at an rf frequency. A transmitter box transmits a first portion of the laser signal and receive a modified optical signal, and outputs a second portion of the laser signal and a portion of the modified optical signal. A first optical fiber carries the first laser signal portion and the modified optical signal, and a second optical fiber carries the second portion of the laser signal and the returned modified optical signal. A receiver box receives the first laser signal portion, shifts the frequency of the first laser signal portion outputs the modified optical signal, and outputs an electrical signal on the basis of the laser signal. A detector at the end of the second optical fiber outputs a signal based on the modified optical signal. An optical delay sensing circuit outputs a data signal based on the detected modified optical signal. An rf phase detect and correct signal circuit outputs a signal corresponding to a phase stabilized rf signal based on the data signal and the frequency received from the receiver box.

24 Claims, 2 Drawing Sheets

LOW JITTER RF DISTRIBUTION SYSTEM

STATEMENT OF GOVERNMENTAL SUPPORT

This invention was made in the course of or under prime contract No. DE-AC02-05CH11231 between the Department of Energy and the University of California. The government has certain rights in this invention.

TECHNICAL FIELD

This disclosure relates to timing distribution in particle accelerators, and more particularly to an optical fiber-based frequency and timing distribution system for accelerator-based light sources.

BACKGROUND

The next generation of high energy particle accelerator-driven light sources will produce sub-100-femtosecond (fs) high-brightness x-ray pulses. Pump-probe experiments at these facilities require synchronization of pulsed lasers and rf accelerating fields on 100 fs time scales over distances of a few hundred meters to several kilometers. Another example is the International Linear Collider (ILC), which does not have timing requirements as strict but rather must maintain good timing stability over distances greater than 10 km. Transmission of high frequency RF signals over long distances is best accomplished by transmitting RF-modulated light over fiber optic. This avoids interference and signal degradation associated with transmission via coaxial cable or waveguide. In systems where the transmission delay through an RF-over-fiber link must be held constant, delay through the link is typically sensed by retroreflecting part of the signal back to the transmitter, where a mechanical delay is controlled to adjust the optical path length. Such systems suffer from limited mechanical delay range, poor reliability of precision mechanical components, and slow response of the controlled delay. Also, expansion of these RF distribution systems to many channels is difficult due to the complexity of the transmitter, which must incorporate many timing sensors and delays. Some of the currently demonstrated fiber optic timing transmission systems transmit a series of short pulses through the fiber to transmit RF frequencies. The frequencies that can be transmitted this way are limited to harmonics and sub-harmonics of the pulse repetition rate, restricting the frequencies available at the receiver.

There is a need, therefore, to develop improved timing distribution transmission line systems by which solve these problems. Mechanical delays can be eliminated by controlling RF phase electronically, resulting in better reliability and increased delay range, limited only by digital electronics and software. Doing delay sensing and control in the receiver can make high channel count timing systems possible by distributing the delay control function. Use of modulated CW light signals enables arbitrary choice of transmitted frequency and modulation format. Stabilized fiber optic transmission lines allow the possibility of femtosecond level synchronization between various accelerator and laser systems by taking advantage of advances in optical communication technology and metrology.

SUMMARY

A timing signal distribution system includes an optical frequency stabilized laser signal having an optical frequency $\omega_{op}$, wherein the laser signal is amplitude modulated at an rf frequency $\omega_{rf}$, a transmitter box temperature controlled to about ±0.01° C. configured to transmit a first portion of the laser signal via a first optical fiber to a receiver box and to receive a modified optical signal via the first optical fiber, and transmit a second portion via a second optical fiber to a reference detector co-located with the receiver box. The system further includes an optical delay sensing circuit coupled to the reference detector that outputs a frequency signal used by the receiver box to produce a frequency shift in the laser signal, providing the modified optical signal. The system further includes an rf phase detect and correct signal circuit to generate a reduced phase jitter stabilized rf signal at $\omega_{rf}$ on the basis of the phase of the $\omega_{rf}$ laser signal transmitted on the first optical fiber and the phase of the modified optical signal received from the reference detector by the optical delay sensing circuit.

A method of stabilizing a distributed rf signal includes providing and transmitting an optical frequency stabilized laser signal having an optical frequency $\omega_{op}$, wherein the laser signal is amplitude modulated at an rf frequency $\omega_{rf}$, over a first optical fiber to a receiver box and over a second fiber to a reference detector co-located with the receiver box. The method further includes detecting the a first portion of the amplitude modulated laser signal in a detector in the receiver box and frequency shifting, using a stable frequency oscillator, and reflecting a second portion of the amplitude modulated laser signal back to the transmitter box over the first optical fiber. The method further includes transmitting a portion of the reflected frequency shifted amplitude modulated laser signal from the transmitter box to the reference detector over the second optical fiber. The method further includes comparing the phase of the shift frequency detected by the reference detector to the stable frequency oscillator to determine an amount of phase jitter in the first optical fiber. The method further includes detecting the phase of the first portion of the amplitude modulated laser signal in a detector in the receiver box and generating a phase stabilized output rf signal on the basis of the amount of phase jitter.

DESCRIPTION OF THE FIGURES

For a more complete understanding of the present disclosure, reference is now made to the following descriptions taken in conjunction with the accompanying drawings.

DETAILED DESCRIPTION

Figure 1:
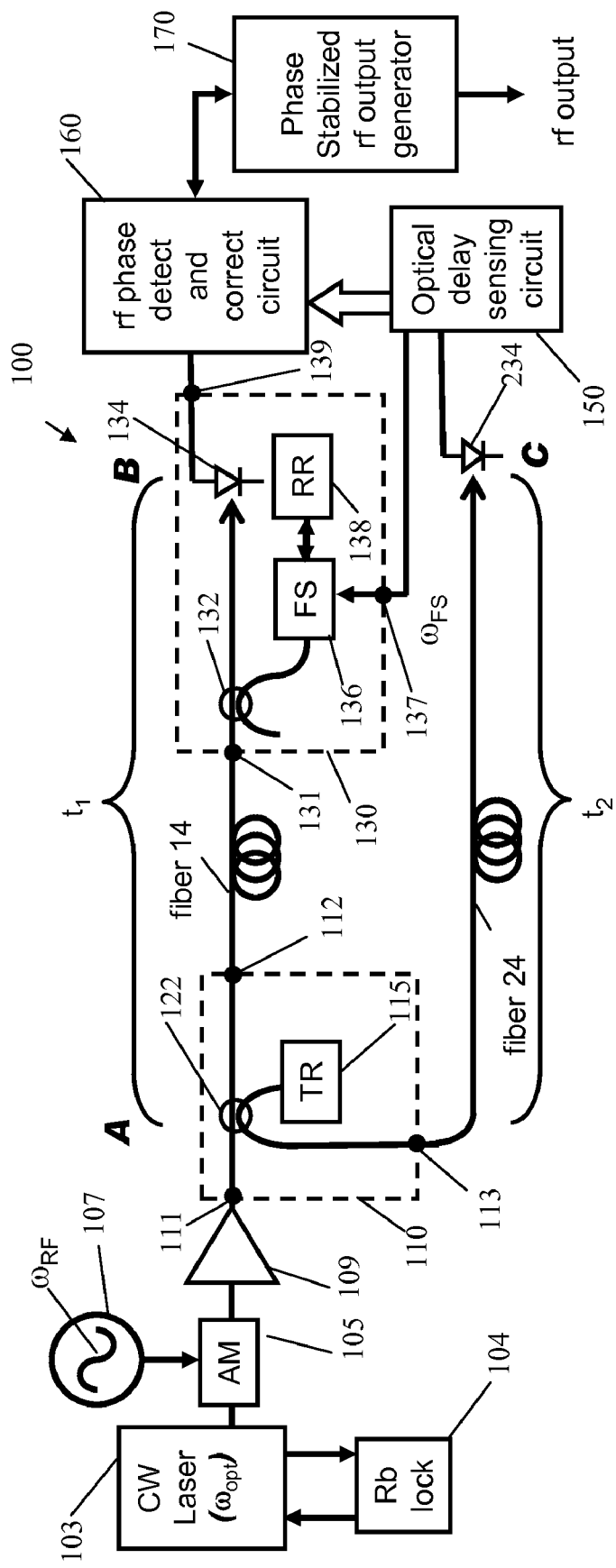
FIG. 1 shows one embodiment of a single-channel rf transmission and delay stabilization link according to an embodiment of the disclosure.

FIG. 1 shows a single-channel rf transmission and delay stabilization link 100. The optical phase delay through a fiber is precisely measured using a heterodyne interferometer. This measurement is used to correct the phase error of an rf signal $\omega_{rf}$, which is transmitted on that fiber. Simplified equations for propagation of optical and rf signals through the link may be derived, assuming that the small and constant delays within temperature controlled portions of the system are substantially zero.

To understand the operation of the interferometer, consider an optical wave originating from a continuous wave (CW) laser 103 that is, for example, amplitude modulated (AM) by an optical amplitude modulator 105 driven by a radio frequency (rf) source 107 at a frequency $\omega_{rf}=2\pi f_{rf}$. The modulation could also be frequency or phase modulation of the optical carrier, as is common in fiber telecommunications. The rf frequency $\omega_{rf}$ may be, for example, 2850 MHz, and the optical amplitude modulator 105 may be, for example, a lithium niobate electro-optic modulator, and may be used as the clocking signal for synchronization. The modulated optical wave may be amplified by an optical amplifier 109. The optical wave is coupled through a first port 111 of a transmitter box 110 located at point A into a first coupler port of a four-port transmitter fiber directional coupler 122. The transmitter box 110 also has a second port, 112 and third port 113. A second coupler port of the transmitter fiber directional coupler 122 is coupled to a first optical fiber 14 through the second port 112. The first optical fiber 14 has an optical propagation delay time t1 from the transmitter box 110 to a receiver box 130 located at point B having an optical port 131. The first optical fiber 14 is coupled via the optical port 131 to a four-port receiver fiber directional coupler 132. Two coupler ports of the receiver fiber directional coupler 132 are coupled, respectively, to a first detector 134 and to an optical frequency shifter FS 136. The frequency shifter FS 136 is coupled to a receiver reflector RR 138. The receiver fiber directional coupler 132, first detector 134, optical frequency shifter FS 136, and receiver reflector 138 are included in the receiver box 130. The optical wave is shifted in frequency by $\omega_{FS}$ by the optical frequency shifter FS 136, and retro-reflected by the receiver reflector RR 138. The optical wave is shifted in frequency again when passing back through the FS 136 for a total optical frequency shift of $2\omega_{FS}$. The optical wave goes backward through the receiver fiber directional coupler 132 via the fiber 14 with delay t1 to the transmitter box 110, and then, via the first fiber directional coupler 122 to port 113, and through a second fiber 24 with delay t2 to an optical reference detector 234 at point C that is substantially co-located with the receiver box 130 at point B. The path just described is referred to as the long path. A second path through the interferometer is from port 111 in the transmitter box 110, through directional coupler 122 to a transmitter reflector 115, back through the directional coupler 122, exiting box 110 through port 113 and through fiber 24 to the reference detector 234 at C. This is referred to as the short path, since the light only takes the short path through the fiber between coupler 122 and reflector 115, which can be 1 meter or less. These two waves, traveling the long and short paths, can be represented by their electric fields at C, the co-location of the receiver box 130 and the reference detector 234, which contain information as to the phase shifts each wave has encountered along its path.

An rf phase detect and correct circuit 160 coupled to the detector 134 is a digital rf phase comparator used to determine the phase of the transmitted rf signal received at the first detector 134 and provide a phase stabilized rf signal at $\omega_{rf}$ on the basis of a phase comparison of the signal detected at the reference detector with a stable oscillator at $\omega_{FS}$ internal to an optical delay sensing circuit 150 with a local signal $\omega_{FS}$, described below. In this way, phase stabilization of the rf signal at $\omega_{rf}$ is accomplished by signal processing originating at the receiver (i.e., distributed) location.

Critical rf and optical components in box 110 and box 130 are temperature stabilized to ±0.01° C. All processing of rf signals is done at an intermediate frequency, e.g., 50 MHz, after mixing down with local oscillator of, for example, at ~2800 MHz.

The electric fields of the long and short paths can be expressed as:

$$E_{long}=\cos(\omega_{op}(t-t_1-t_2)+2(\omega_{FS}(t-t_1-t_2)+\phi_{FS})), \quad (1)$$

$$E_{short}=\cos(\omega_{op}(t-t_2)), \quad (2)$$

where $\omega_{op}$ is the optical frequency (e.g., about $2\pi 200$ THz) of the laser 103, $\omega_{FS}$ is the frequency shifter 107 rf frequency (e.g., 27150 MHz), and $\phi_{FS}$ is a phase that can be added to $\omega_{FS}$ for control. Calculating the intensity incident on the reference detector 234 at C, low-pass filtering the ac component to remove $\omega_{op}$, and mixing the resultant rf with a local oscillator at $2\omega_{FS}$ yields the phase of the detected rf:

$$\phi_{det}=-2\omega_{op}t_1-2\omega_{FS}(t_1-t_2)+2\phi_{FS}. \quad (3)$$

Note that $2\omega_{FS}$ is about $2\times 10^6$ smaller than $\omega_{op}$, so the second term is substantially negligible. If $\phi_{FS}$ can be adjusted so that $\phi_{det}$ is held constant, $\phi_{FS}$ will directly indicate changes in t1, given $\omega_{op}$ held constant also (as explained below). Thus the optical phase delay t1 in fiber 1 can be determined to high precision since it is measured optically.

A control loop holds (Net constant, and the information from $\phi_{FS}$ is used to correct the phase of the rf signal received on detector 134. The corrected phase of the original output rf signal modulated at $\omega_{rf}$ and transmitted over fiber 14 is given by $$\Phi_{rf\_out}(t)=\omega_{rf}t-\omega_{rf}t_1+(\omega_{rf}/\omega_{op})\phi_{FS}\cdot k_{group\_phase}. \quad (4)$$

The first two factors on the right side are the detected rf at detector 134, while the third is the correction provided by the rf phase detect and correct circuit 160. Ideally, the phase $\Phi_{rf\_out}$ would be just $\omega_{rf}t$, as it is at the transmitter. The additional changes due to $\omega_{rf}t_1$ are cancelled by controlling $\phi_{FS}$. There is a factor kgroup_phase, which has to be included, to correct for the difference between group delay (of the rf signal) and phase delay (of the optical carrier) through the fiber due to a temperature dependence of chromatic dispersion. Chromatic dispersion in the fiber shifts the phase of the amplitude-modulation (AM) sidebands compared with their original phase with respect to the carrier at the modulator. This results in a slippage of modulated rf phase with respect to the optical carrier phase as the signal travels, and a difference in group delay. If dispersion was constant with temperature (the main environmental perturbation of the fiber delay), this kgroup_phase factor would not be necessary. Since there is a temperature coefficient of dispersion, this factor is fed forward to the final delay correction of the RF. In practice, this factor can be measured in a loop-back experiment where two channels are compared and then including the correction in the single-channel control software.

The operation of the interferometric optical phase control provides constant optical frequency and phase at the receiver. A system providing constant optical frequency and phase control at the transmitter is described by J. Ye, J.-L. Peng, R. Jason-Jones, K. W. Holman, J. L. Hall, D. J. Jones, S. A. Diddams, J. Kitching, S. Bize, J. C. Bergquist, L. W. Holberg, L. Robertsson, and L. S. Ma, J. Opt. Soc. Am. B 20, 1459 (2003). The system described in accordance with this disclosure differs in that phase sensing and frequency control is done at the receiver. An advantage of this configuration is that rf jitter reduction can be individually controlled at a plurality of remote receiver boxes, where each remote receiver box corrects for jitter accumulated over a different length of fiber transmission distance.

For stable rf transmission, the cw laser 103 used in the interferometer must have a fractional frequency stability less than the desired fractional temporal stability of the transmission delay. For a 2 km link with 10 fs stability, this corresponds to $\Delta\lambda/\lambda=1\times 10^{-9}$. The cw laser frequency is locked to a hyperfine absorption line of a material such as rubidium (Rb) in a vapor cell 104, achieving $\Delta\lambda/\lambda\sim 5\times 10^{-10}$ when two independent lasers are beat together. Frequency locking laser wavelength using a Rb absorption line is described in A.

Bruner, V. Mahal, I. Kiryuschev, A. Arie, M. A. Arbore, and M. M. Fejer, Appl. Opt. 37, 6410 (1998), and S. Masuda, A. Seki, and S. Niki, Appl. Opt. 46, 4780 (1998). Other materials in the vapor state such as, but not limited to, acetylene, hydrogen cyanide, and carbon monoxide may also be used for frequency locking. The CW laser wavelength may be chosen accordingly, but is preferably compatible with commercially available single mode optical fiber transmission bands having low modal and chromatic dispersion.

As shown in FIG. 1, the optical output of a CW laser (having a wavelength, for example, of 1550 nm) is split between a "short arm" of a Michelson interferometer to the transmitter reflector 115 and the "long arm" to the remote receiver box 130 and receiver reflector 138. Critical rf and optical components in the transmitter and receiver boxes (110, 130) are temperature-controlled to a variation of less than about ±0.01° C.

Temperature control to less than ±0.01° C. is well known in the art, using thermoelectric coolers (TECs) controlled by analog controllers. For example, Melcor (1040 Spruce Street, Trenton, N.J. 08648) and Ferrotec (135 Nicholson Lane, San Jose, Calif. 95134) manufacture TEC modules. Wavelength Electronics (51 Evergreen Dr., Bozeman, Mont. 59715) provides analog temperature control systems with stability to 0.001° C.

At the end of the long fiber arm, a frequency shifter FS 136 (e.g., an acousto-optic modulator) excited at, for example, 50 MHz up-shifts the 195 THz laser frequency by 50 MHz, where it is then reflected by a receiver reflector 138, which may be totally reflecting or partially reflecting, for example, from 10% to 100%. The shift of the laser frequency is phase coherent with the 50 MHz rf drive of the FS 136. The reflected laser signal is again shifted by 50 MHz by its return passage through the FS 136, resulting in a 100 MHz total frequency shift where it returns along the long fiber, and combines with a sample of the original laser frequency from the interferometer short arm in the transmitter box 113. The use of 50 MHz as the frequency shift $\omega_{FS}$ is merely exemplary, and another frequency may be used. The short arm of the splitter 122 terminates in a transmitter reflector TR 115, where the optical signal is reflected back through the splitter 122, and at least a portion of which is coupled through port 113 to the fiber 24.

A 50 MHz signal is generated by an optical delay sensing circuit 150. This signal is sent to the frequency shifter FS 136, which imparts additional phase to the optical signal passing through it, equal to the phase of the incoming 50 MHz rf signal supplied by the optical delay sensing circuit 150. The frequency shifter is double-passed, so the effect is the 50 MHz signal multiplied by 2. On returning to the transmitter at box 110, this frequency shifted optical signal is added to the original laser signal reflected from the transmitter reflector TR 115, and they both travel forward to the reference detector 234. The variation of the phase length of the first fiber 14 is phase coherent to the phase variation of the 100 MHz shifted return optical signal detected by the detector 234. The original laser frequency and the shifted laser frequency from the long arm are transmitted along a second fiber 24, an error signal fiber, to a detector 234 where they produce a 100 MHz beat note.

The detected signal at 100 MHz is divided by 2 and compared in phase with the 50 MHz signal sent to the frequency shifter by the optical delay sensing circuit 150. If the delay through fiber 14 is constant, the relative phase between these two 50 MHz signals will be constant. If there is a change in delay through fiber 14, there will be a positive or negative change in the relative phase of the 50 MHz signals, i.e., between the phase of the signal generated by the optical delay sensing circuit 150 and the phase of the 50 MHz signal (after division by 2) at the detector 234. This can be translated into time by multiplying the phase change in radians by the optical period over $2\pi$. This is information that can be used to shift the phase of the rf signal received by the first detector 134 (at ~3 GHz).

Additionally, this information can be used to adjust the phase of the rf signal sent from the optical delay sensing circuit 150 to the frequency shifter FS 136, in a feedback scheme so that the optical phase delay through fiber 14 plus the frequency shifter 136 is constant. That is, the 100 MHz beat signal received at detector 234 exhibits no additional phase accumulation beyond what is added by the frequency shifter FS 136 (an amount controlled by the optical delay sensing circuit 150). Thus, any phase delay variations through fiber 14 are canceled, and the optical frequency appearing at the receiver is the same as that coming from the transmitter. The scheme of FIG. 2 (explained in more detail below) shows how the stabilized optical frequency could be made available. In this scheme, the receiver reflector 338 is partially transmitting, allowing light to pass through to detector 134. If the above feedback technique is implemented, the light passing through reflector 338 is frequency and phase stabilized with respect to the transmitter 110. This is useful for stable optical frequency distribution, or for timing schemes based on optical phase.

When this feedback scheme is used, the amount of correction applied to the 50 MHz rf sent to the frequency shifter FS 136 is based on the fiber 14 phase delay change—i.e., jitter—due to environmental effects. This phase correction is the information sent from the optical delay sensing circuit 150 to an rf phase detect and correct circuit 160 for detector 134. The rf phase detect and correct circuit 160 can directly generate a phase stabilized RF output signal directly. Alternatively, the rf phase detect and correct circuit 160 can output a control signal to a stable rf output generator 170, which is located at the receiver end of the rf transmission and delay stabilization link 100. The effect on the final delivered rf signal transmitted through the system (at ~2850 MHz) is the same in either case.

Any change in the phase length of the long fiber detected by a phase shift of the 100 MHz signal at the reference detector 234 is applied by the optical delay sensing circuit 150 to shift the phase of the FS 136. The resulting error signal is integrated, the integral representing the change of phase length of the fiber, which shifts the phase of the 50 MHz drive signal to the FS 136. All these function can be combined in a single chip field-programmable gate array (FPGA) controller in the optical delay sensing circuit 150. Likewise, all functions of the RF phase detect and correct circuit can be implemented in an FPGA, possibly the same one used for the optical delay sensing circuit.

Figure 2:
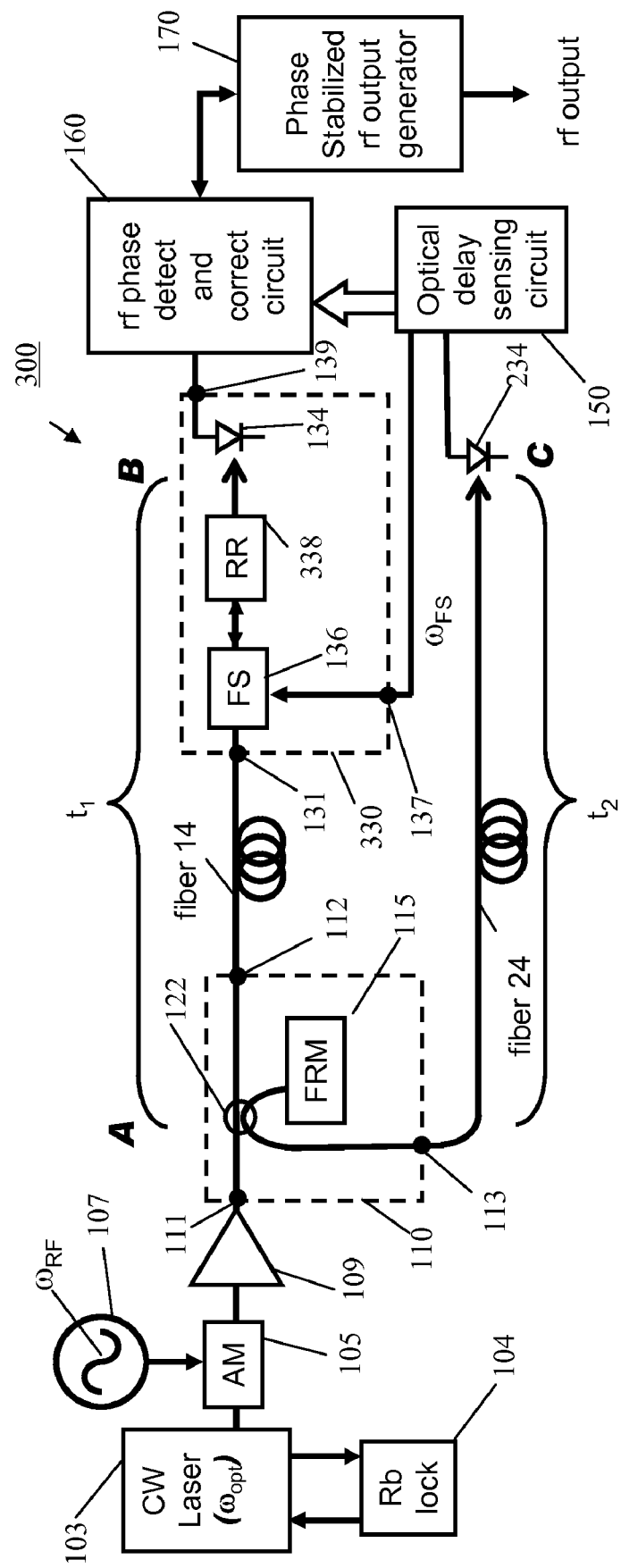
FIG. 2 shows a second embodiment of a single-channel rf transmission and delay stabilization link according to an embodiment of the disclosure.

In an alternative embodiment, FIG. 2 shows a second embodiment of a single-channel rf transmission and delay stabilization link 300. With the exception of the configuration of a receiver box 330 that is also temperature controlled to about ±0.01° C., as above, all components and their arrangement are identical to the embodiment described above. The receiver box 330 has ports identical to that of receiver box 130. In receiver box 330, FS 136 is directly coupled to optical port 131. A receiver reflector RR 338 is coupled to FS 136 to receive the frequency shifted laser signal. RR 338, however, is a partial reflector/partial transmitter reflector, having, for example, a 50%/50% split between transmission and reflection. The transmitted portion is transmitted to the receiver detector 134, which outputs an electrical signal to electrical port 139, while the optical reflected portion returns through the FS 136, where it is again frequency shifted by $\omega_{FS}$, for a net frequency shift of $2\omega_{FS}$, as with receiver 130. The FS 136 receives the operating frequency signal $\phi_{FS}$ via electrical port 137, as with receiver box 130. Rf phase delay jitter detection and correction is accomplished substantially the same as in the first embodiment as shown in FIG. 1.

The transition to an all-electronic/fiber-optic system as described above can provide substantially unlimited range of correction, and increased reliability.

The frequency reference for the system is the 195 THz laser frequency itself, which must be stabilized, for example, to 1 part in $10^9$ for the system to provide 10 femtosecond stability over a 2 km long fiber. The CW laser 103 is stabilized by taking a sample of the laser output, doubling its frequency, and locking it to a saturated absorption line in a Rubidium cell using a Pound-Drever-Hall technique described by Eric. D. Black, "An introduction to Pound-Drever-Hall laser frequency stabilization," Am. J. Phys. 69, 79 (2001).

Disclosed is a system for stable radio frequency distribution that has been tested to provide less than 20 fs rms jitter and drift over 2.2 km of optical fiber for 60 hrs, and less than 10 fs over a 200 m fiber, using common fiber telecommunications components and microwave electronics, so that the system is manufacturable and low cost. It is straightforward to expand to many channels, because all delay control is done electronically in the receiver rather than by mechanical delays at the transmitter. Eliminating commonly used mechanical delays also improves reliability and provides an arbitrarily large delay correction range, limited only by software. Because delay sensing is done using a continuous optical carrier, rapid delay changes beyond the control bandwidth are tracked continuously without jumping fringes. Standard fiber is used, requiring no dispersion compensation. Signal processing in the receiver is done digitally, so all key parameters are inherently controllable. Any frequency or combination of frequencies can be transmitted, in contrast to a fixed set of harmonics available in pulsed schemes.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the embodiments of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A timing signal distribution system comprising:
   an optical frequency stabilized laser signal having an optical frequency $\omega_{op}$, wherein the laser signal is amplitude modulated at an rf frequency $\omega_{rf}$;
   a transmitter box (110) temperature controlled to about ±0.01° C. having a first optical port (111) to receive the laser signal, a second optical port (112) to transmit a first portion of the laser signal and receive a modified optical signal, and a third optical port (113) to output a second portion of the laser signal and at least a portion of the returned modified optical signal;
   a first optical fiber (14) having a first end and a second end, the first end coupled to the first optical port (111) to carry the first portion of the laser signal and the modified optical signal;
   a second optical fiber (24) having a first end and a second end, the first end coupled to the third optical port (113) to carry the second portion of the laser signal and the portion of the returned modified optical signal;
   a receiver box (130) temperature controlled to about ±0.01° C. having an optical receiver port (131) coupled at a second end of the first optical fiber (14) to receive the first portion of the laser signal and output the modified optical signal, a first electrical port (137) to receive an electrical frequency shift signal to shift the frequency of the first portion of the laser signal to provide the modified optical signal, and a second electrical port (139) to output an electrical signal on the basis of the first portion of the laser signal;
   a reference detector (234) at a second end of the second optical fiber (24) co-located with the receiver box (130) to output a detector signal on the basis of the modified optical signal carried over the second optical fiber (24);
   an optical delay sensing circuit (150) coupled to the reference detector (234) adapted to output a frequency signal to the first electrical port (137) of the receiver box (130) and output a data signal on the basis of the detected phase of the modified optical signal; and
   an rf phase detect and correct signal circuit (160) coupled to the receiver box second electrical port (139) and coupled to the optical delay sensing circuit (150) to receive the data signal, the rf phase detect and correct signal circuit (160) adapted to output a signal corresponding to a phase stabilized rf signal at the frequency $\omega_{rf}$ on the basis of the data signal and the frequency received from the second electrical port (139).

2. The system of claim 1, further comprising:
   an optical amplitude modulator (105) to receive the optical signal from the laser (103); and
   a radio frequency (rf) source (107) having an rf frequency $\omega_{rf}$ coupled to the optical amplitude modulator (105) to drive the optical amplitude modulator (105) to amplitude modulate the laser signal at the rf frequency $\omega_{rf}$.

3. The system of claim 1, the transmitter box (110) further comprising:
   a first optical fiber directional coupler (122) having at least four ports, wherein a first coupler port is coupled to the optical amplitude modulator (105) via the transmitter box (110) first optical port (111), a second coupler port is coupled to a transmitter box second optical port (112), a third coupler port is coupled to a first box third optical port (113), and a fourth coupler port; and
   a transmitter reflector (115) coupled to the fourth coupler port.

4. The system of claim 1, where a first embodiment of the receiver box (130) further comprises:
   a receiver box optical port (131) coupled to the second end of the first optical fiber (14), a first electrical port (137) and a second electrical port (139);
   a second optical fiber directional coupler (132) having at least four coupler ports, wherein
   a first coupler port is coupled to the receiver box optical port (131);
   a second coupler port is coupled to a first optical detector (134);
   a third coupler port coupled to an optical frequency shifter (136), in which the optical frequency shifter (136) shifts an optical signal by a frequency $\omega_{FS}$, the optical frequency shifter (136) coupled to the first electrical port (137) to receive an electrical signal corresponding to the frequency $\omega_{FS}$; and a receiver reflector RR (138) coupled to the optical frequency shifter (136) to reflect the frequency shifted optical signal, wherein the reflected optical signal has a net frequency shift of $2\omega_{FS}$.

5. The system of claim 1, where a second embodiment of the receiver box (330) further comprises:
a receiver box optical port (131) coupled to the second end of the first optical fiber (14), a first electrical port (137) and a second electrical port (139);
an optical frequency shifter FS (136) coupled to the optical port (131) and to the first electrical port (137);
a receiver reflector RR (338) coupled to the optical frequency shifter FS (136), where the receiver reflector RR (338) is a partial reflector/partial transmitter of an optical signal; and
a first optical detector (134) coupled to the receiver reflector RR (338), where an electrical output of the first optical detector (134) is coupled to the first electrical port (137).

6. The system of claim 1, further comprising:
a continuous wave laser (103) outputting an optical signal at a frequency of about $\omega_{op}$.

7. The system of claim 6, further comprising a vapor phase absorption cell (104) coupled to the continuous wave laser (103) to frequency stabilize the laser signal, the vapor phase absorption cell (104) containing a selected material in the vapor phase.

8. The system of claim 7, wherein the selected material in the vapor phase is at least one of rubidium, acetylene, hydrogen cyanide, and carbon monoxide.

9. The system of claim 1, further comprising:
an optical amplitude modulator (105) receiving the optical signal from the laser (103) and outputting the amplitude modulated laser signal;
a radio frequency (rf) source (107) operable at the rf frequency $\omega_{rf}$, the rf source coupled to the optical amplitude modulator (105) to control the optical amplitude modulator (105) to amplitude modulate the laser signal.

10. The system of claim 9, further comprising:
an optical amplifier (109) to receive the amplitude modulated optical signal from the laser (103) and provide an amplified optical signal to the first optical port (111) of the box (110).

11. The system of claim 1, further comprising a phase stabilized rf output generator (170) coupled to the rf phase detect and correcting circuit (160) to output the phase stabilized at the frequency $\omega_{rf}$ on the basis of the signal output from the rf phase detect and correcting circuit (160).

12. The system of claim 1, wherein the first optical fiber (14) and the second optical fiber (24) transmit single mode optical signals at the optical frequency that is about $\omega_{op}$.

13. A method of stabilizing a distributed rf signal, comprising:
providing an optical frequency stabilized laser signal having an optical frequency $\omega_{op}$, wherein the laser signal is amplitude modulated at an rf frequency $\omega_{rf}$;
providing a transmitter box (110) temperature controlled to about ±0.01° C. having a first optical port (111) to receive the laser signal, a second optical port (112) to transmit a first portion of the laser signal and receive a modified optical signal, and a third optical port (113) to output a second portion of the laser signal and at least a portion of the returned modified optical signal;
coupling the first portion of the laser signal and the modified optical signal into a first optical fiber (14) having a first end and a second end, the first end coupled to the second optical port (112);
coupling the second portion of the laser signal and the portion of the returned modified optical signal via the third optical port (113) into a first end of a second optical fiber (24);
outputting the second portion of the laser signal and the portion of the returned modified optical signal at a second end of the second optical fiber (24);
receiving the first portion of the laser signal at an optical receiver port (131) of a receiver box (130) temperature controlled to about ±0.01° C., the receiver box (130) further having a first electrical port (137) to receive an electrical frequency signal to modify frequency of the first portion of the laser signal to provide the modified optical signal, and a to output an electrical signal on the basis of the first portion of the laser signal;
receiving, at a reference detector (234) at a second end of the second optical fiber (24) co-located with the receiver box (130), the second portion of the laser signal and the portion of the returned modified optical signal;
outputting from the reference detector (234) to a optical delay sensing circuit (150) an electrical signal on the basis of the returned modified optical signal;
outputting from the optical delay sensing circuit (150) to the first electrical port (137) a frequency signal and outputting a data signal on the basis of the detected phase of the modified optical signal;
receiving at an rf phase detect and correct signal circuit (160) coupled to the receiver box second electrical port (139) the data signal;
receiving at the rf phase detect and correct signal circuit (160) from the second electrical port (139) the electrical signal on the basis of the first portion of the laser signal; and
outputting from the rf phase detect and correct signal circuit (160) a signal corresponding to a phase stabilized rf signal at the frequency w on the basis of the data signal and the frequency received from the second electrical port (139).

14. The method of claim 13, further comprising:
receiving the optical signal from the laser (103) at an optical amplitude modulator (105); and
driving the optical amplitude modulator (105) to amplitude modulate the laser signal at the rf frequency $\omega_{rf}$ using a radio frequency (rf) source (107) having an rf frequency $\omega_{rf}$ coupled to the optical amplitude modulator (105).

15. The method of claim 13, wherein the transmitter box (110) comprises:
a first optical fiber directional coupler (122) having at least four ports, wherein a first coupler port is coupled to the optical amplitude modulator (105) via the transmitter box (110) first optical port (111), a second coupler port is coupled to a transmitter box second optical port (112), a third coupler port is coupled to a first box third optical port (113), and a fourth coupler port; and
a transmitter reflector (115) coupled to the fourth coupler port.

16. The method of claim 13, wherein the receiver box (130) comprises:
a receiver box optical port (131) coupled to the second end of the first optical fiber (14), a first electrical port (137) and a second electrical port (139);
a second optical fiber directional coupler (132) having at least four coupler ports, wherein a first coupler port is coupled to the receiver box optical port (131);

a second coupler port is coupled to a first optical detector (134);

a third coupler port coupled to an optical frequency shifter (136), in which the optical frequency shifter (136) shifts an optical signal by a frequency $\omega_{FS}$, the optical frequency shifter (136) coupled to the first electrical port (137) to receive an electrical signal corresponding to the frequency $\omega_{FS}$; and a receiver reflector RR (138) coupled to the optical frequency shifter (136) to reflect the frequency shifted optical signal, wherein the reflected optical signal has a net frequency shift of $2\omega_{FS}$.

17. The method of claim 13, wherein the receiver box (330) comprises:

a receiver box optical port (131) coupled to the second end of the first optical fiber (14), a first electrical port (137) and a second electrical port (139);

an optical frequency shifter FS (136) coupled to the optical port (131) and to the first electrical port (137);

a receiver reflector RR (338) coupled to the optical frequency shifter FS (136), where the receiver reflector RR (338) is a partial reflector/partial transmitter of an optical signal; and a first optical detector (134) coupled to the receiver reflector RR (338), where an electrical output of the first optical detector (134) is coupled to the first electrical port (137).

18. The method of claim 13, further comprising:

providing a continuous wave laser (103) outputting an optical signal at a frequency of about $\omega_{op}$.

19. The method of claim 18, further comprising:

providing a vapor phase absorption cell (104) coupled to the continuous wave laser (103) to frequency stabilize the laser signal, the vapor phase absorption cell (104) containing a selected material in the vapor phase.

20. The method of claim 19, further comprising selecting material in the vapor phase from at least one of rubidium, acetylene, hydrogen cyanide, and carbon monoxide.

21. The method of claim 13, further comprising:

modulating the amplitude of the frequency stabilized laser signal at the rf frequency $\omega_{rf}$ using an optical amplitude modulator (105) driven by a radio frequency (rf) source (107) operable at the rf frequency $\omega_{rf}$.

22. The method of claim 21, further comprising:

amplifying the amplitude modulated optical signal from the optical modulator (105) using an optical amplifier (109); and providing the amplified modulated optical signal to the first optical port (111) of the box (110).

23. The method of claim 13, further comprising:

coupling a phase stabilized rf output generator (170) to the rf phase detect and correcting circuit (160);

outputting the phase stabilized at the frequency $\omega_{rf}$ on the basis of the signal output from the rf phase detect and correcting circuit (160).

24. The method of claim 13, wherein the first optical fiber (14) and the second optical fiber (24) transmit single mode optical signals at the optical frequency that is about $\omega_{op}$.

* * * * *